(12) United States Patent
Jiang et al.

(10) Patent No.: US 8,211,578 B2
(45) Date of Patent: Jul. 3, 2012

(54) MAGNESIUM CELL WITH IMPROVED ELECTROLYTE

(75) Inventors: Zhiping Jiang, Westford, MA (US); Rimma Sirotina, Ashland, MA (US); Nikolay Iltchev, Norfolk, MA (US)

(73) Assignee: The Gillette Company, Boston, MA (US)

( * ) Notice: Subject to any disclaimer, the term of this patent is extended or adjusted under 35 U.S.C. 154(b) by 458 days.

(21) Appl. No.: 12/455,885

(22) Filed: Jun. 9, 2009

(65) Prior Publication Data
US 2010/0310933 A1 Dec. 9, 2010

(51) Int. Cl.
*H01M 6/16* (2006.01)
(52) U.S. Cl. ..... 429/339; 429/206; 429/323; 429/231.6; 429/231.1; 429/221; 252/62.2
(58) Field of Classification Search ............ 429/339, 429/206, 323, 231.6, 231.1, 221; 252/62.2
See application file for complete search history.

(56) References Cited

U.S. PATENT DOCUMENTS

| | | | |
|---|---|---|---|
| 5,223,353 A * | 6/1993 | Ohsawa et al. ............ | 429/307 |
| 5,290,414 A | 3/1994 | Marple | |
| 6,265,109 B1 | 7/2001 | Yamamoto | |
| 6,403,255 B1 * | 6/2002 | Gofer et al. ............ | 429/213 |
| 6,991,876 B2 | 1/2006 | Narang | |
| 7,285,356 B2 | 10/2007 | Issaev | |
| 7,459,237 B2 | 12/2008 | Totir | |

OTHER PUBLICATIONS

Petr Novak and Johann Desilvestro, "Electrochemical Insertion of Magnesium in Metal Oxides and Sulfides from Aprotic Electrolytes", J. Electrochem. Soc., vol. 140, No. 1, Jan. 1993, p. 140-144.
Petr Novak, Roman Imhof, Otto Haas, "Magnesium Insertion Electrodes for Rechargeable Nonaqueous Batteries—A Competitive Alternative to Lithium?", Electrochimica Acta, vol. 45 (1999), p. 351-367.

* cited by examiner

*Primary Examiner* — Laura Weiner
(74) *Attorney, Agent, or Firm* — Vladimir Vitenberg; Barry D. Josephs

(57) ABSTRACT

An improved electrolyte for a cell having an anode comprising magnesium or magnesium alloy. The cell's cathode may desirably include iron disulfide ($FeS_2$) as cathode active material. The improved electrolyte comprises a magnesium salt, preferably magnesium perchlorate dissolved in an organic solvent which preferably includes acetonitrile or mixture of tetrahydrofuran and propylene carbonate. The electrolyte includes an additive to retard the buildup of deleterious passivation coating on the magnesium anode surface, thereby enhancing cell performance. Such additive may preferably include 1-butyl-3-methylimidazolium tetrafluoroborate ($BMIMBF_4$), 1-butyl-3-methylimidazolium hexafluorophosphate ($BMIMPF_6$), lithium hexafluorophosphate ($LiPF_6$), or aluminum chloride ($AlCl_3$).

3 Claims, 1 Drawing Sheet

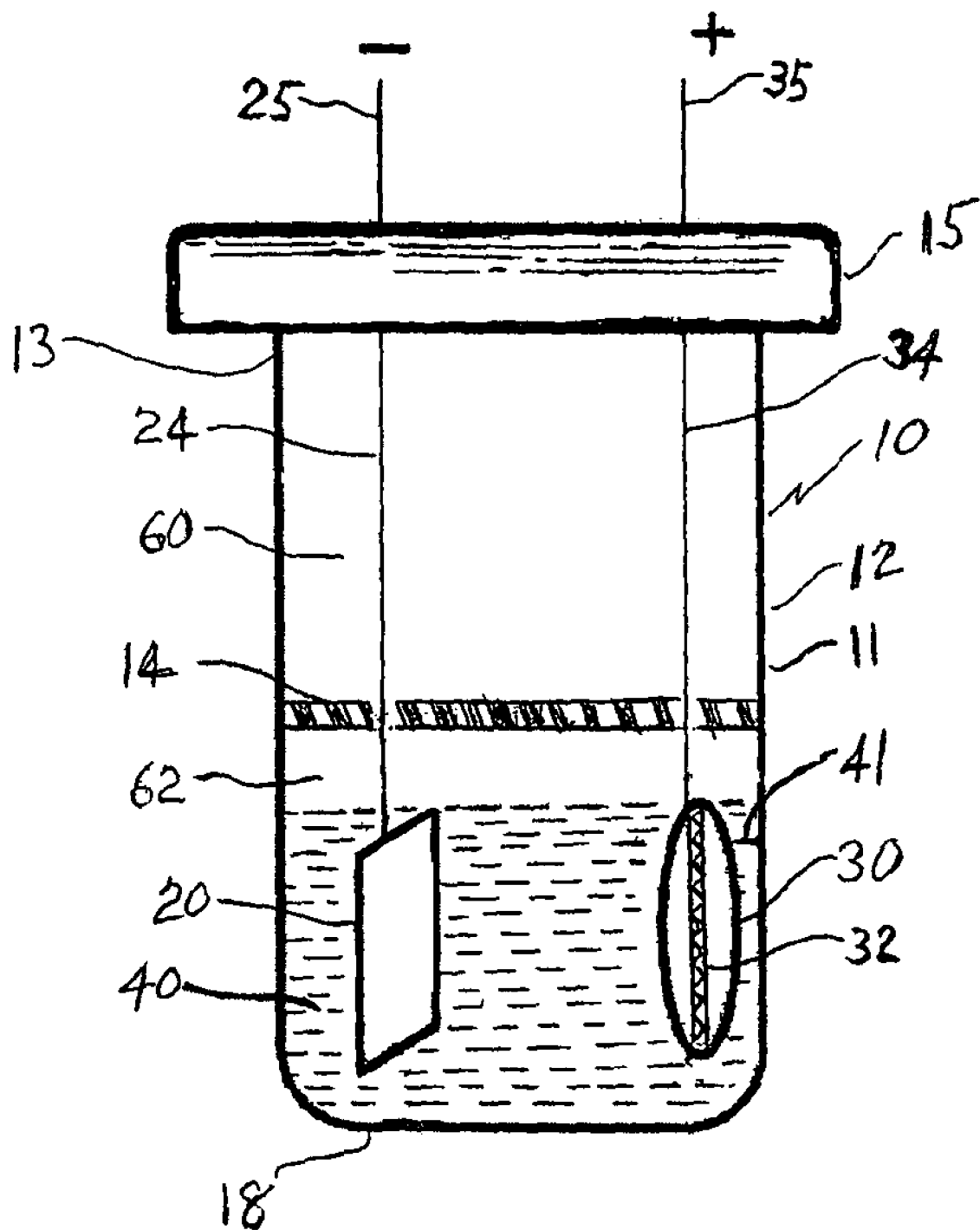

MAGNESIUM CELL WITH IMPROVED ELECTROLYTE

FIELD OF THE INVENTION

The invention relates to a magnesium cell with an anode comprising magnesium or magnesium alloy and a cathode preferably comprising iron disulfide and an electrolyte having an additive therein to retard buildup of deleterious passivation layer on the magnesium anode surface.

BACKGROUND

Metal/air batteries have been studied for many years. The zinc/air battery is the most widely known and used. It is most commonly used in the form of small button cells as a power source for electronic hearing aids. Since the depolarizer, that is, the true cathode material is normally incoming air, the cell has high capacity and energy density for its size. The cell's anode is usually formed of a slurry of zinc particles wetted with an aqueous solution of alkaline electrolyte. The cathode material typically contains a small amount of a mixture of manganese dioxide particles, graphite and carbon black which mixture catalyzes the electrochemical reaction of incoming air and zinc. The anode reaction is $Zn+2(OH)^{-1} = ZnO+H_2O+2e$. The cathode reaction is $\frac{1}{2}O_2+H_2O+2e=2(OH)^{-1}$. The overall reaction for this cell is: $Zn+\frac{1}{2}O_2=ZnO$. Although the aqueous alkaline electrolyte, typically an aqueous solution of KOH, has high ionic conductivity and is an excellent electrolyte for the system, there are some disadvantages in employing the aqueous electrolyte. Although there is no net water consumed or generated in the electrochemical reaction, a principal disadvantage is that once the cell is activated by allowing atmospheric air to enter the cell, the cell has a very short activated life. This is caused by the interaction between the electrolyte and atmospheric air, since the atmospheric humidity conditions in which the cell is operated is also a factor. In a low-humidity environment the water in the electrolyte tends to vaporize into the environment, causing the "drying out" phenomenon. In a high a high-humidity condition, the water vapor in the atmosphere tends to enter the electrolyte, causing a "flooding" phenomenon. Both situations interfere with cell performance and shorten the cell's activated life. In addition as atmospheric carbon dioxide enters the cell interior, it will gradually react with the aqueous KOH electrolyte to form potassium carbonate, $K_2CO_3$. The formation of carbonates interferes with achieving the desired cell performance. Such potential problems are not limited to the zinc/air cell but would be of concern in any metal/air cell employing an aqueous alkaline electrolyte.

Magnesium primary (non-rechargeable) batteries have been developed which employ an anode of magnesium alloy material and a cathode comprising manganese dioxide and acetylene black and an aqueous electrolyte. The cell may be referenced as a primary $Mg/MnO_2$ cell. The aqueous electrolyte is an alkaline electrolyte which may contain magnesium perchlorate and magnesium hydroxide with barium and lithium chromate as corrosion inhibitors. The electrolyte is an aqueous electrolyte and the amount of water therein is important as the water participates in the anode reaction and is consumed during cell discharge. See, e.g. David Linden, *Handbook of Batteries,* Second Edition (1995), McGraw Hill, p. 9.2-9.3. During cell discharge the magnesium metal in the anode reacts with hydroxide $(OH)^-$ ions from the alkaline electrolyte resulting in production of magnesium hydroxide $Mg(OH)_2$ which precipitates. The anode reaction is $Mg+2(OH)^-=Mg(OH)_2+2e$. The cathode reaction is $2MnO_2+H_2O+2e=Mn_2O_3+2(OH)^-$. The overall reaction for the cell can be written as $Mg+2MnO_2+H_2O=Mn_2O_3+Mg(OH)_2$. The $Mg(OH)_2$ is not soluble in the alkaline electrolyte and tends to form an insoluble passivation film on the surface of the magnesium anode as the cell discharges. The film passivates the cell's electrochemical activity. That is, the $Mg(OH)_2$ film on the magnesium anode surface continues to retard the kinetics of the electrochemical discharge reaction as the cell is used, since the passivation layer continues to form on the magnesium anode surface during cell use and even during storage. The resulting effect is that the cell does not perform to its potential resulting in significant loss in capacity and power. Because of this problem the cell has not become popular.

Magnesium/air (Mg/air) primary cells have also been attempted. The anode comprises magnesium metal or magnesium alloyed with a minor amount of another metal. The Mg/air cell typically contains an aqueous alkaline electrolyte as above described with respect to the $Mg/MnO_2$ cell. The anode is oxidized by incoming air which passes into the cell through an internal air diffusion filter. The incoming air passes through the cell's separator and contacts the magnesium anode allowing the electrochemical discharge reaction to occur. The cell's anode reaction is: $Mg=Mg^{2+}+2e$. The cathode reaction is $\frac{1}{2}O_2+H_2O+2e=2(OH)^{-1}$. The overall reaction is: $Mg+\frac{1}{2}O_2+H_2O=Mg(OH)_2$ The cathode may include carbon material such as acetylene black which acts as a catalyst to improve the rate of electrochemical reaction between the magnesium anode and incoming air. In this respect the magnesium/air cell functions in manner similar to the zinc/air cell, which has a principal use as a hearing aid battery. However, unlike the zinc/air cell the magnesium/air cell has the same problem as above described with respect to the $Mg/MnO_2$ cell, namely formation of a $Mg(OH)_2$ passivation layer on the surface of the magnesium anode as the cell is discharged.

The formation of the $Mg(OH)_2$ passivation layer on the magnesium anode significantly interferes with attainment of the desired cell performance. As a result the Mg/air cell has gained only very limited practical application. One such limited application of the Mg/air cell has been to develop and apply the cell as reserve power source for undersea applications, where the slight acidic nature of seawater and dissolved oxygen in the seawater function as electrolyte and cathode active material respectively. Such a battery has a long shelf life (sealed) because it remains dry in its unactivated state and does not become activated until immersed in sea water. That is, the battery does not initially contain water and becomes immediately activated on deployment when it is immersed into the sea water. The slight acidic nature of the sea water tends to neutralize the $Mg(OH)_2$ as it forms in the cell during cell discharge.

In view of the problems and limited application of magnesium batteries having aqueous based electrolytes, there has been some effort to replace the aqueous based electrolyte with organic electrolyte for these batteries. However, this has proved to be a very difficult problem. Magnesium anode tends to react with non-aqueous electrolytes as well to form a film significantly passivating the electrochemical activity of the anode. Consequently, no practical prior art electrochemical cell has been achieved with magnesium anode based on non-aqueous electrolytes. Additionally, the non-aqueous electrolytes for application to magnesium cells have to date been insufficiently ionic conductive compared to aqueous electrolytes. That is, prior art non-aqueous electrolytes do not exhibit high enough ionic conductivity for the magnesium ions and do not provide sufficiently high ionic transport properties allowing the necessary transport of the magnesium ions therethrough. This results in loss of rate capability and tends to reduce the power output potential of magnesium cells when non-aqueous electrolytes are used to replace known aqueous electrolytes. Such limitations highlight the need to search for more conductive non-aqueous electrolyte systems or find improvements to existing systems in order to make the electrolyte more suitable for application to magnesium batteries.

U.S. Pat. No. 6,265,109 B1 discloses a metal/air battery wherein the anode comprises a magnesium metal preferably in the form of magnesium alloyed with a minor amount of another metal, namely, indium (In), gallium (Ga), tin (Sn), lead (Pb), cadmium (Cd), manganese (Mn), cobalt (Co), zinc (Zn), and thallium (Tl). The reference is directed principally at a magnesium/air cell. The possible inclusion of iron sulfide into the cathode is mentioned, but this is in connection with a specific organic electrolyte, namely, trimethylsulfoxide (TMSO) containing $Mg(ClO_4)_2$ dissolved therein at 1 mol per 1 mol of the solvent. (col 7, lines 7-14). Organic non-aqueous electrolytes are disclosed for use in the magnesium/air cell. The disclosed organic electrolytes may contain $Mg(ClO_4)_2$ salt dissolved in a solvent comprising an acid amide such as N-methylformamide or N,N-dimethylformamide and the electrolyte preferably comprises at least one other solvent selected from the group consisting of dimethylacetoamide, acetonitrile, ethylene carbonate, propylene carbonate, and γ-butyrolactum. Good results are reported. However, the utilization of such electrolytes, per se, does not prevent deleterious passivation layers from forming on the magnesium anode surface. Such passivation material in addition to $Mg(OH)_2$ may also include MgO or $Mg(CO_3)$. The $Mg(CO_3)$ may develop in the magnesium/air cell as a result of reaction between magnesium ions and atmospheric carbon dioxide which enters into the cell along with the incoming air. The reference does not suggest additives for the electrolyte which would specifically retard the rate of formation of the passivation material on the magnesium anode surface in order to improve the cell's performance.

U.S. Pat. No. 6,991,876 B2 discloses a metal/active oxygen battery containing a non-aqueous electrolyte. The anode is preferably lithium, sodium, magnesium, or aluminum. The oxidizing medium is not atmospheric air but rather and oxygen containing species within the cell, thereby functioning as the cell's cathode. The active oxygen containing species may be organic in which case it is indicated to be covalently coupled to an organic peroxide-containing material. The active oxygen species may be ionically coupled to a metal, such as lithium, preferably forming lithium peroxide, $Li_2O_2$, which may be dispersed in a carbon-containing carrier. The disclosed non-aqueous electrolyte includes preferred electrolytes lithium hexafluorophosphate salt $LiPF_6$ dissolved in solvent mixture comprising ethylene carbonate and demethyl carbonate, or a mixture of ethylene carbonate, dimethyl carbonate, and triethylphosphate. The reference, as indicated by the examples, is principally directed to lithium cells wherein the cathode contains active oxygen. Specific cells fabricated and tested are lithium/lithium peroxide ($Li/Li_2O_2$) cells as shown in the examples. The possibility of a magnesium/lithium peroxide battery is also discussed briefly at col. 9.

There has also been some investigation on the possibility of employing magnesium insertion electrodes for rechargeable batteries which utilize non-aqueous electrolytes. The intent is to develop a battery which would allow the reversible formation of magnesium ions to form during cell discharge and revert back to magnesium during cell charging much in the same way as a lithium ion rechargeable battery operates. In such cell a suitable host electrode material into which the magnesium may be inserted is needed as well as suitable non-aqueous electrolyte which has the proper combination of properties of sufficient stability and conductivity. Possibilities for such a rechargeable system utilizing a magnesium negative electrode is explored in the reference: Petr Novak, Roman Imhof, and Otto Haas, *Magnesium Insertion Electrodes for Rechargeable Nonaqueous Batteries—A Competitive Alternative to Lithium?*, Electrochimica Acta, Vol. 45 (1999), 351-367. Although some possibilities have been investigated there is no commercial rechargeable cell of this type yet on the market.

Accordingly, it is desired to find a suitable non-aqueous electrolyte system for electrochemical cells employing anodes comprising magnesium or magnesium alloy as anode active material.

It is desired that the electrolyte system be suitable for cells having an anode comprising magnesium or magnesium alloy and either an air cathode or a cathode comprising iron disulfide.

In particular it is desired that the non-aqueous electrolyte system be suitable for cells having an anode comprising magnesium or magnesium alloy and cathode comprising iron disulfide.

It is desired to find an electrolyte system comprising a magnesium salt dissolved in a non-aqueous solvent mixture wherein the electrolyte system is suitable for the above indicated cells having an anode comprising magnesium or magnesium alloy, wherein one or more specific additives are added to the solvent mixture in order to retard formation of a passivation coating on the anode surface.

SUMMARY OF THE INVENTION

The invention is directed to an improved electrolyte for electrolytic cells having an anode comprising magnesium or magnesium alloy (magnesium cells). The cathode which utilizes the electrolyte of the invention preferably comprises a mixture of iron disulfide ($FeS_2$) and carbon particles. The electrochemical discharge reaction may be air assisted, that is, the cell may optionally allow atmospheric air to enter the cell and participate in the electrochemical discharge reaction. The cell of the invention is preferably a primary (non-rechargeable) cell, typically a primary cell which is not air assisted. However, it is not intended that the cell of the invention be necessarily restricted to primary cells, since rechargeable cells utilizing the electrolyte of the invention may also be possible. In a preferred embodiment herein presented the cell is a primary (non-rechargeable) cell with the improved electrolyte of the invention and an anode comprising a magnesium or magnesium alloy and a cathode comprising iron disulfide ($FeS_2$), preferably iron disulfide powder and carbon mixture. The average particle size of the $FeS_2$ is desirably between about 6 and 30 micron, preferably between about 10 and 25 micron. The carbon may include carbon black, or graphite or mixtures of carbon black and graphite. The carbon black may include in whole or in part acetylene black carbon particles. Thus, the term carbon black as used herein shall be understood to extend to and include carbon black and acetylene black carbon particles. Battery grade graphites may be employed in the cathode selected from natural, synthetic, or expanded graphite and mixtures thereof.

The magnesium metal in the anode may be alloyed with small amounts of other metal, for example, small amounts of aluminum or zinc. A suitable representative magnesium alloy for the cell's anode is a magnesium alloy consisting of 96 wt % Mg, 3 wt % Al, 1 wt % Zn, which can be available as a thin sheet. The magnesium alloy elements (other than magnesium) typically comprises less than about 5 wt % of the total alloy composition. Thus, the term "magnesium" or "magnesium metal" as used herein shall be understood to include such magnesium alloy. The magnesium which forms the anode active material, is preferably in the form of a thin sheet.

A principal aspect of the invention is directed to an improved electrolyte for the magnesium cell, that is electrochemical cells having an anode comprising magnesium or magnesium alloy. The improved electrolyte of the invention is a non-aqueous electrolyte. The term "non-aqueous" electrolyte as used herein is defined as electrolytes wherein the water content is less than 200 parts by weight water per million parts by weight of total electrolyte. In actual application the water content of the electrolyte of the invention is more typically less than about 100 parts by weight water per million parts by weight of total electrolyte. The electrolyte of the invention comprises a magnesium salt dissolved in a non-aqueous solvent or solvent mixture to which small amount of at least one additional component, namely, an "additive" is included. It has been determined that the preferred additive may be selected from 1-butyl-3-methylimidazolium tetrafluoroborate ($BMIMBF_4$), or 1-butyl-3-methylimidazolium hexafluorophosphate ($BMIMPF_6$), or lithium hexafluorophosphate ($LiPF_6$), or aluminum chloride ($AlCl_3$). The $BMIMBF_4$ and $BMIMPF_6$ are classified as ionic liquids, that is, they contain essentially only ions. They decompose only very slowly in the presence of water. $BMIMBF_4$ has a molecular formula $C_8H_{15}BF_4N_2$ and a Chem. Abstracts Number (CAS-174501-65-6) $BMIMPF_6$ has a molecular formula $C_8H_{15}F_6N_2P$ and a Chem. Abstracts Number (CAS-174501-64-5). Additional property information and chemical structure for these two ionic liquids may be found at web sites www.wikipidia.org and www.sigmaaldrich.com. Lithium hexafluorophosphate is an inorganic chemical available as white crystalline powder. It has the molecular formula $LiPF_6$ and a CAS number 21324-40-3. Aluminum chloride has the molecular formula $AlCl_3$ and a CAS number 7446-70-0. Aluminum chloride is a solid at ambient temperature and exits in anhydrous form as $AlCl_3$ or as a hydrate, namely, $AlCl_3 \cdot 6H_2O$.

As described in the above background discussion a serious problem which has heretofore limited the development and practical application of the magnesium cell has been the tendency of the magnesium anode to develop a deleterious passivation coating on its surface. Such passivation coating may develop as the cell is stored or more rapidly during cell discharge. The passivation coating may typically include buildup of alkaline material for example $Mg(OH)_2$ or $MgO$ film on the magnesium anode surface. The buildup of such material increasingly retards the kinetics of the electrochemical discharge reaction as the cell is used. The resulting effect is that the cell does not perform to its potential resulting in significant loss in capacity and power.

When at least one of the additives of the invention are mixed into the non-aqueous electrolyte a very pronounced improvement in the magnesium cell discharge performance has been observed. This is attributed to the effect of the additive in retarding the rate of formation of deleterious passivation layer on the magnesium anode surface or the tendency of the additive to neutralize such deleterious passivation layer as it builds on the magnesium surface. The true mechanism for the beneficial effect of the additives of the invention in retarding buildup of such passivation layer on the magnesium anode surface is not known with certainty. However, it is believed that the beneficial effect of the additives of the invention is enhanced in part because they are acidic in nature whereas the passivation material is alkaline, thus tending to prevent formation of the passivation material. However, the additives of the invention are compatible with the magnesium salt and solvents used in the electrolyte and may also be enhancing the overall effect of the electrolyte in its ability to provide the proper conductive medium to transport the $Mg^{+2}$ ions during cell discharge. The additives of the invention are included in relatively small quantity, so that they do not significantly retard cathode activity. It is surprising the concentration of the additives of the invention in the electrolyte do not have to be high in order to obtain the desired beneficial improvement in magnesium cell performance. When the additives are selected from 1-butyl-3-methylimidazolium tetrafluoroborate ($BMIMBF_4$), or 1-butyl-3-methylimidazolium hexafluorophosphate ($BMIMPF_6$), or lithium hexafluorophosphate ($LiPF_6$), or aluminum chloride ($AlCl_3$), the additive may desirably comprise between about 0.2 and 5 wt %, typically between about 0.5 and 4 wt %, for example, between about 0.5 and 2 wt % of the total electrolyte.

A desirable electrolyte of the invention includes the magnesium salt, preferably magnesium perchlorate $Mg(ClO_4)_2$, for example 0.5 g-moles per liter $Mg(ClO_4)_2$, dissolved in a non-aqueous solvent system comprising acetonitrile and at least one of the above described additives of the invention, namely, at least one of $BMIMBF_4$, or $BMIMPF_6$, or $LiPF_6$, or $AlCl_3$. The magnesium perchlorate $Mg(ClO_4)_2$ is a very strong oxidizing agent and appears as white powder at room temperature. Magnesium perchlorate has a Chem. Abstracts number CAS-10034-81-8. Acetonitrile solvent is a colorless liquid with the formula $CH_3CN$, which is the simplest organic nitrile. Acetonitrile has a CAS number 75-05-8.

Another desirable electrolyte of the invention includes the magnesium salt, preferably magnesium perchlorate $Mg(ClO_4)_2$, for example 0.4 g-moles per liter $Mg(ClO_4)_2$, dissolved in a non-aqueous solvent mixture comprising tetrahydrofuran (THF) and propylene carbonate (PC) in 60/40 volume ratio and at least one of the above described additives of the invention, namely, at least one of $BMIMBF_4$, or $BMIMPF_6$, or $LiPF_6$, or $AlCl_3$. Tetrahydrofuran (THF) is a fully hydrogenated heterocyclic compound (low viscosity organic liquid at room temperature) and having the chemical formula $C_4H_8O$. Tetrahydrofuran has a CAS number 109-99-9. Propylene carbonate is a cyclic organic carbonate, also known as cyclic propylene carbonate. It is a colorless odorless liquid at room temperature. Propylene carbonate has the molecular formula $C_4H_6O_3$ and has a CAS number 108-32-7.

The electrolyte of the invention has as its principal application as electrolyte for electrochemical cells having an anode comprising magnesium or magnesium alloy. The cathode preferably comprises iron disulfide ($FeS_2$) as a cathode active material. The electrolyte of the invention may be applied to other cells, for example, cells having an anode comprising magnesium or magnesium alloy and a cathode comprising at least one cathode active material selected from $MnS_2$, $CuS_2$, $CoS_2$, $NiS_2$ or $MnO_2$.

BRIEF DESCRIPTION OF THE DRAWINGS

FIG. 1 is an pictorial view of a cell with electrolyte of the invention and an anode of magnesium or magnesium alloy and cathode comprising carbon or iron disulfide and carbon.

DETAILED DESCRIPTION

All of the cells constructed and tested can be characterized broadly as magnesium cells. The term magnesium cells as used herein shall be understood to mean electrochemical cells wherein the anode contains at a least a major amount of magnesium metal or magnesium metal alloy. The cells tested were all further characterized in that the electrolyte employed was a non-aqueous electrolyte. The term "non-aqueous" electrolyte as used herein is defined as electrolytes wherein the water content is less than 200 parts by weight water per million parts by weight of total electrolyte. More typically, the actual water content of the non-aqueous electrolytes herein described have a water content of less than about 100 parts by weight water per million parts by weight of total electrolyte.

A test cell 10 was constructed. The cell had a housing 12 having an elongated body 11 terminating at one end in a closed bottom 18 and at opposite end in open end 13. Housing 12 was of glass in order to view cell contents. After the cell's contents were inserted the cell's open end 13 was closed with end cap 15. The cell was designed to test the electrochemical discharge performance of employing an anode strip of magnesium alloy material with different cathode materials and varying electrolytes. Although the cell was a test cell it was fully functional as a complete electrochemical cell. The principal objective was to test cell performance employing varying non-aqueous electrolyte formulations and different cathode materials while keeping the anode of the same magnesium alloy composition. The non-aqueous electrolyte formulations as presented herein were thus subjected to full cell discharge testing in that a full anode and cathode was employed for each test as well as a complete electrolyte formulation. It will be appreciated that the anode and cathode compositions along with the specific electrolyte formulations herein presented and tested may be employed in other cell configurations of other material, for example, a housing 12 of nickel plated steel. Such other cell configurations may include button cell configurations as shown, for example, in U.S. Pat. No. 6,447,947 B1, or wound electrode cell configurations, for example, as shown in U.S. patent application publication U.S. 2008/0057403 A1 with end cap configurations also as illustrated therein.

Test cell 10 was formed by first fabrication an anode strip composed of magnesium alloy (96 wt % Mg, 3 wt % Al, 1 wt % Zn) which was available under the trade designation AZ31 magnesium alloy from Magnesium Electron, NA Company. The anode used in each cell test was of this same material and was in the form of a rectangular anode strip 20 having a surface area of 2 cm$^2$ on each face and thickness of 13 mil (0.0330 cm). The anode strip 20 volume was thus 2×0.0333=0.066 cm$^3$. Given the density of magnesium at 1.74 g/cm$^3$, aluminum at 2.70 g/cm$^3$ and zinc at 7.13 g/cm$^3$, the total weight, W, of anode strip 20 is calculated from the formula 0.96 W/1.74+0.03 W/2.70+0.01 W/7.13=0.066. Then W=0.117 g and thus weight of Mg in anode 20 is 0.96×0.117=0.112 g. In each cell test the anode was in theoretical capacity excess compared to the cathode.

While the anode composition was the same for each test cell, that is, the anode 20 was composed of the above indicated magnesium alloy (96 wt % Mg, 3 wt % Al, 1 wt % Zn), there were three different cathode compositions used in the test cells, resulting in the following three different Test Cell Types A, B, and C. The magnesium alloy anode 20 had been exposed to atmospheric air for at least several weeks before its use in the test cells. Immediately before use in the test cells and any comparative cells, the magnesium alloy anode 20 was pretreated by using a fine grade sandpaper to rub off the oxide coatings on the exposed surfaces of the magnesium anode 20. This resulted in a magnesium anode 20 having clean exposed surfaces free of oxides or other contaminant coatings thereon.
Test Cell Type A—Anode and Cathode Composition (Mg/Carbon Air Cell)

In Test Cell Type A the above indicated magnesium alloy anode 20 (96 wt % Mg, 3 wt % Al, 1 wt % Zn) was employed with a cathode 30 prepared by pressing 80 mg of an acetylene black/TEFLON mixture known as teflonized acetylene black (available as TAB-2 acetylene black from Hohsen Corporations, Japan) onto cathode current collector sheet 32 formed of a sheet of expanded aluminum foil. Thus cathode 30 was essentially of carbon black and there was zero amount of FeS$_2$ in cathode 30. The expanded aluminum foil has perforations therethrough. (Alternatively, cathode current collector sheet 32 may be a solid sheet of aluminum foil without perforations.) The TEFLON material (tetrafluoroethylene) mixed into the acetylene black acts as binder material for the cathode.
Test Cell Type B—Anode and Cathode Composition (Mg/FeS$_2$ Cell or Mg/FeS$_2$ Air Cell)

In Test Cell Type B the above indicated magnesium alloy anode 20 (96 wt % Mg, 3 wt % Al, 1 wt % Zn) was employed with a cathode 30 prepared by dry mixing a cathode mixture of 50 mg of iron disulfide powder (FeS$_2$ powder) and 80 mg of the teflonized acetylene black (TAB-2 acetylene black from Hohsen Corporations, Japan). Thus the FeS$_2$ comprised 38.5 wt % of the cathode mixture. The iron disulfide powder was available under the trade designation FeS$_2$ Pyrox Red 325 powder from Chemetall GmbH. The FeS$_2$ Pyrox Red 325 powder has a particle size sufficiently small that the particles will pass through a sieve of Tyler mesh size 325 (sieve openings of 0.045 mm). (The residue amount of FeS$_2$ particles not passing through the 325 mesh sieve is 10% max.) After the mixture of FeS$_2$ and acetylene black was prepared it was pressed onto a cathode current collector sheet 32 of expanded aluminum foil. The mixture was pressed onto both sides of aluminum sheet 32 by applying about 3 metric tons of pressure, thereby forming cathode 30.
Test Cell Type C—Anode and Cathode Composition (Mg/FeS$_2$ Cell or Mg/FeS$_2$ Air cell)

In Test Cell Type C the above indicated magnesium alloy anode 20 (96 wt % Mg, 3 wt % Al, 1 wt % Zn) was employed with a cathode 30 prepared by dry mixing a cathode mixture of 100 mg of iron disulfide powder (FeS$_2$ powder) and 80 mg of the teflonized acetylene black (TAB-2 acetylene black from Hohsen Corporations, Japan). Thus the FeS$_2$ comprised 55.5 wt % of the cathode mixture. The iron disulfide powder was available under the trade designation FeS$_2$ Pyrox Red 325 powder from Chemetall GmbH. The FeS$_2$ Pyrox Red 325 powder has a particle size sufficiently small that the particles will pass through a sieve of Tyler mesh size 325 (sieve openings of 0.045 mm). (The residue amount of FeS$_2$ particles not passing through the 325 mesh sieve is 10% max.) After the mixture of FeS$_2$ and acetylene black was prepared it was pressed onto a cathode current collector sheet 32 of expanded aluminum foil. The mixture was pressed onto both sides of aluminum sheet 32 by applying about 3 metric tons of pressure, thereby forming cathode 30.

In each of the Test Cells Types A, B, or C cell after anode 20 and cathode 30 were formed an anode conductor line 24 of copper was welded directly to anode 20 and an cathode conductor line 34 was welded to the aluminum current collector sheet 32 within cathode 30. An optional air filter disc 14 composed of air permeable filter paper can be inserted over anode 20 and cathode 30 electrodes. The air filter 14, if used, absorbs carbon dioxide and thus prevents carbon dioxide in the incoming air from penetrating into the electrolyte. The amount of headspace 60 over the anode 20 and cathode 30 can be adjusted by adjusting the amount of electrolyte filled into housing 12. There is enough electrolyte 40 filled into the housing 12 so that the anode 20 and cathode 30 electrodes are always totally submerged in electrolyte. When it is desired to have incoming air available to participate in the discharge reaction, the incoming atmospheric air is allowed to enter into headspace 60, for example, through apertures (not shown) in end cap 15. If the optional air filter 14 is used, then the incoming air also passes through filter 14 and into headspace 62 immediately above the electrodes. At least a portion of the oxygen in the incoming air becomes absorbed into electrolyte 40. In tests in which it is desired not to have air participate in the electrochemical discharge reaction, the headspace over the electrodes is filled with argon gas so that there is no chance of air penetrating into the electrolyte solution.

In discharge tests involving Test Cell Types A, B or C the housing 12 was filled with non-aqueous electrolyte 40. The electrolyte 40 was composed of specific non-aqueous electrolyte formulations, with and without the additives of the invention in order to evaluate the effectiveness of the electrolyte and additive combinations on cell performance. After electrolyte 40 was added to the desired level submerging the electrodes 20 and 30, a sealing end cap 15 was secured over housing 12 in order to closed the housing open end 13. Anode conductor line 24 and cathode conductor lines 34, were pulled through small apertures (not shown) in end cap 15 so that the terminal ends 25 and 35 of conductor lines 24 and 34, respectively, penetrated into the external environment. Terminal end 25 formed the cell's negative terminal and terminal end 35 formed the cell's positive terminal.

Different non-aqueous electrolyte systems of the invention were added to the above Cell Types A, B, and C in order to evaluate the effect these electrolytes on cell performance. The electrolyte systems contained therein different additives of the invention and the effect of these additives on cell performance was investigated. In some experiments air was allowed to participate in the electrochemical discharge reaction so that the cell in such case was in effect a magnesium/air cell by allowing air to enter the headspace 60 above the electrodes. Otherwise the headspace 60 was filled with argon gas so that there was no chance that air would participate in the electrochemical discharge reaction. The effect of the electrolyte systems with different additives therein was investigated on aspects of performance of these magnesium/sir cells. Typically, the actual water content of the non-aqueous electrolytes herein described have a water content of less than about 100 parts by weight water per million parts by weight of total electrolyte.

Electrolyte Systems of the Invention

The non-aqueous electrolyte systems which were investigated and applied to the above three cell types A, B and C were composed of a magnesium salt dissolved in a non-aqueous solvent (or non-aqueous solvent mixture). The actual water content of the non-aqueous electrolytes herein describe is less than about 200 parts by weight water per million parts by weight of total electrolyte, more typically less than about 100 parts by weight water per million parts by weight of total electrolyte. The electrolyte comprised a magnesium salt dissolved in a non-aqueous solvent system. The magnesium salt which was dissolved in each electrolyte tested was the same, namely, magnesium perchlorate, $Mg(ClO_4)_2$. Magnesium perchlorate is normally made by reaction between magnesium hydroxide and perchloric acid. It is available in hydrate $Mg(ClO_4)_2$, $6H_2O$ and non-hydrate form $Mg(ClO_4)_2$. The magnesium perchlorate used in the test electrolytes of the invention was substantially of non-hydrate form. That is, the mole percent of the hydrate form, namely, $Mg(ClO_4)_2 \cdot 6H_2O$ in the total magnesium perchlorate used in the electrolytes herein is estimated to be no more than about 1 mole percent. The electrolyte systems used in the test cells were composed of magnesium perchlorate salt dissolved in a solvent comprising either a) acetonitrile ($CH_3CN$) or b) a mixture of tetrahydrofuran ($C_4H_8O$) and propylene carbonate ($C_4H_6O_3$). These electrolyte systems were utilized with and without the additives of the invention in order to investigate the effect of the additives on performance of the electrolyte system as a whole during cell discharge. The additives of the inventions were selected from 1-butyl-3-methylimidazolium tetrafluoroborate ($BMIMBF_4$), or 1-butyl-3-methylimidazolium hexafluorophosphate ($BMIMPF_6$), or lithium hexafluorophosphate ($LiPF_6$), or aluminum chloride ($AlCl_3$)

Test Results for Electrolyte of Invention in $Mg/FeS_2$ Cells (Zero Air Participating)

In a principal set of experimental tests the Test Cells having the anode and cathode compositions of Type B cells (Mg/$FeS_2$ cell) as above indicated, made as shown in FIG. 1, were used to investigate comparative discharge performance with different electrolytes with and without the additives of the invention. The additives, namely, were the electrolyte salt additives selected from $BMIMPF_4$, $BMIMPF_6$, $LiPF_6$, or $AlCl_3$. The headspace above the anode 20 and cathode 30 was filled with argon gas so there was no possibility of air participating in the electrochemical discharge reactions. Six different Type B sample cells were formed and discharged. The discharge results were compared and are summarized in Table 1 and 1A. The anode 20 for each of the six sample cells was the same, that is, it were composed of the above described magnesium alloy of content 96 wt % Mg, 3 wt % Al, and 1 wt % Zn. The cathode 30 for each of the six sample cells was the same. That is, cathode 30 for each of the six sample cells was prepared by dry mixing a cathode mixture of 50 mg of iron disulfide powder ($FeS_2$ powder) and 80 mg of the teflonized acetylene black (TAB-2 acetylene black from Hohsen Corporations, Japan) and pressing the mixture onto cathode current collector sheet 32 of expanded aluminum foil. The comparative sample cells were cells 1B and 5B, since the electrolytes therein did not contain any of the additives of the invention. The comparative sample cell 1B and 5B did not have any of the electrolyte additives of the invention included therein. The electrolyte compositions are given in Tables 1 and 1A. Sample cells 2B, 3B, and 4B had the same electrolyte as comparative cell 1B except the at least one of the additives of the invention were added to the electrolyte in the sample cells. Specifically, additive $BMIMPF_6$ was added to the sample cell 2B electrolyte, additive $LiPF_6$ was added to the sample cell 3B electrolyte, and $BMIMBF_4$ was added to sample cell 4B electrolyte, and there was no additive included in comparative cell electrolyte 1B. (See Table 1) Sample cell 6B had the same electrolyte as comparative sample cell 5B except that the additive $AlCl_3$ was added to the electrolyte in sample 6B and there was no additive included in the electrolyte of comparative cell 5B (See Table 1A).

The sample cells were all discharged at a constant rate of 0.1 mA (2 mA/g of $FeS_2$ in the cathode) to a voltage cutoff of 0.6V. The capacity delivered to 0.8V cutoff in the first set of comparable sample cells, namely, cells 1B-4B was examined (Table 1). The comparative cell 1B without any additive of the invention included in the electrolyte only delivered a capacity of less than 10 mAh/g $FeS_2$ (about 1 mAh/g $FeS_2$) while sample cells 2B, 3B, and 4B with one of the additives of the invention included in the electrolyte delivered a capacity of at least 300 mAh/g of $FeS_2$ as indicated in Table 1. The best performance was with cell 4B which included additive $BMIMBF_4$ in the electrolyte. The capacity delivered from this cell 4B was 670 mAh/g of $FeS_2$.

The average discharge voltage for the cells 2B-4B with the additives was between about 1.1V and 1.3V, while the comparative cell 1B without any additive delivered almost no voltage. This together with the high delivered capacity of sample cells 2B-4B is good evidence that the anode's magnesium surface was much more active in cells 2B-4B (with additive) than in the comparative cell 1B (without additive). The rate of deleterious passivation coating buildup on the anode's magnesium surface in sample cells 2B-4B is therefore much less than in comparative cell 1B.

Similarly, the capacity delivered from sample cell 6B which included one of the additives of the invention, namely, $AlCl_3$ in the electrolyte, was far better than the capacity delivered from comparative cell 5B without any additive (Table 1A). Specifically the sample cell 6B with additive $AlCl_3$ delivered 226 mAh/g of $FeS_2$ while comparative cell 5B without additive only delivered a capacity of less than 10 mAh/g $FeS_2$ (about 0.5 mAh/g $FeS_2$) as indicated in Table 1A. The average discharge voltage for cell 6B was 1.3V. On the other hand, the comparative cell 5B without any additive delivered almost no voltage. This together with the much higher capacity of cell 6B suggests that the anode's magnesium surface in cell 6B was more active. That is, the rate of deleterious passivation coating buildup on the anode's magnesium surface in sample cell 6B (with additive) is much less than in comparative cell 5B (without additive). In sum the discharge results shown in Tables 1 and 1A indicate a clear performance benefit resulting from inclusion of one of the additives of the invention to the non-aqueous electrolyte.

TABLE 1

Electrolytes Tested for $Mg/FeS_2$ Cells

| Sample Cell[1,2] | Electrolyte Composition | Cell Capacity[3] Delivered to 0.8 V Cutoff (mAh/g of $FeS_2$) |
|---|---|---|
| 1B (Comparative) | 0.5M $Mg(ClO_4)_2$ in acetonitrile solvent | Negligible (less than 10) |
| 2B | 0.5M $Mg(ClO_4)_2$ in acetonitrile solvent plus 1 wt % $BMIMPF_6$ additive[4] | 309 |
| 3B | 0.5M $Mg(ClO_4)_2$ in acetonitrile solvent plus 0.5 wt % $LiPF_6$ additive | 382 |
| 4B | 0.5M $Mg(ClO_4)_2$ in acetonitrile solvent plus 1.5 wt % $BMIMBF_4$ additive[5] | 670 |

Notes:
[1] Anode for each cell was magnesium alloy sheet weight 0.117 grams (composition 96 wt % Mg, 3 wt % Al, 1 wt % Zn)
[2] Cathode for each cell contained dry mixture of 50 mg of iron disulfide powder ($FeS_2$ powder) and 80 mg of the teflonized acetylene black (38.5 wt % $FeS_2$) pressed onto both sides of an expanded aluminum sheet.
[3] Cell discharged at constant current drain of 0.1 mA (2 mA/g $FeS_2$) to a voltage cutoff of 0.8 V. Headspace over electrodes was filled with argon gas so there was no chance of air participating in the electrochemical discharge reaction.
[4] 1-butyl-3-methylimidazolium hexafluorophosphate ($BMIMPF_6$)
[5] 1-butyl-3-methylimidazolium tetrafluoroborate ($BMIMBF_4$)

TABLE 1A

Additional Electrolytes Tested for $Mg/FeS_2$ Cells

| Sample Cell[1,2] | Electrolyte Composition | Cell Capacity[3] Delivered to 0.8 V Cutoff (mAh/g of $FeS_2$) |
|---|---|---|
| 5B (Comparative) | 0.4M $Mg(ClO_4)_2$ in 60 vol % tetrahydrofuran (THF) and 40 vol % propylene carbonate (PC) solvent | Negligible (less than 10 mAhr/g $FeS_2$) |
| 6B | 0.4M $Mg(ClO_4)_2$ in 60 vol % tetrahydrofuran (THF) and 40 vol % propylene carbonate (PC) solvent plus 0.5 wt % $AlCl_3$ additive | 226 |

Notes:
[1] Anode for each cell was magnesium alloy sheet weight 0.117 grams (composition 96 wt % Mg, 3 wt % Al, 1 wt % Zn)
[2] Cathode for each cell contained dry mixture of 50 mg of iron disulfide powder ($FeS_2$ powder) and 80 mg of the teflonized acetylene black (38.5 wt % $FeS_2$) pressed onto both sides of an expanded aluminum sheet.
[3] Cell discharged at constant current drain of 0.1 mA(2 mA/g $FeS_2$) to a voltage cutoff of 0.8 V. Headspace over electrodes was filled with argon gas so there was no chance of air participating in electrochemical discharge reaction.

Test Results for Electrolyte of Invention in $Mg/FeS_2$ Air Cells

In another principal set of experimental tests Test Cells having anode and cathode compositions as Type A and C cells ($Mg/FeS_2$ air cells) as above indicated, made as shown in FIG. 1, were used to investigate comparative discharge performance with different electrolytes with and without the additives of the invention. The electrolyte additives, namely, were the salt additives selected from $BMIMPF_4$, $BMIMPF_6$, $LiPF_6$, or $AlCl_3$. The electrolyte compositions and test results are given in Table 2. In the sample set of cells 1, 2, and 3 the comparative is cell 1. In this set of sample cells (1, 2, and 3) the headspace above the anode 20 and cathode 30 was filled with atmospheric air so there was at least the possibility of some participation of air in the electrochemical discharge reactions. In the sample set of cells 4 and 5 the headspace above the anode 20 and cathode 30 was filled with argon gas so that there was no possibility of air participating the electrochemical reaction.

In sample cells set 1 to 3, cells 2 and 3 included $FeS_2$ in the cathode but comparative cell 1 was free of $FeS_2$ and had a cathode made of only teflonized carbon black as indicated in Table 2. The electrolytes in sample cells 1 to 3 were all the same and all included the same additive of the invention, namely, $BMIMPF_6$. Upon cell discharge at constant current drain of 0.1 mAmp to a voltage cutoff of 0.8V, the comparative cell 1 (without $FeS_2$) delivered an average discharge voltage of 1.5V whereas the sample cells 2 and 3 delivered a higher average of 1.65V for cell 2 and 1.74V for cell 3. Also the capacity for cells 2 and 3 containing $FeS_2$ in the cathode had higher capacity than comparative cell 1 without any $FeS_2$. This showed that the electrolytes of the invention with the $BMIMPF_6$ additive promoted the electrochemical discharge reaction and it was possible for air to participate in the discharge reaction for sample cells 2 and 3 as in comparative cell 1. However, the cells 2 and 3 which contained $FeS_2$ in the cathode performed better than the comparative cell 1 (without any $FeS_2$) in that they attained higher average discharge voltage and higher capacity.

In respect to cell set 4 and 5 (Table 2) the cell anode and cathode compositions were the same (anodes were the same and cathodes were the same with both cells containing same amount of $FeS_2$). Also the electrolyte use in both cells 4 and 5 were the same except that cell 5 contained the electrolyte additive of the invention $BMIMPF_6$ and comparative cell 4 did not contain any of the electrolyte additives of the invention. (See Table 2) The headspace above anode and cathode in cells 4 and 5 was filled with argon gas, so there was no chance of air participating in the electrochemical discharge reaction. Upon discharge of cells 4 and 5 at constant current drain of 0.1 mA to a voltage cutoff of 0.8V, the comparative cell 4 had an average voltage of only 0.45 and negligible capacity (the initial discharge voltage was below cut off so discharge capacity was negligible). By contrast cell 5 (with the $BMIMPF_6$ electrolyte additive) had an average voltage of 1.3 volts and delivered significant capacity as shown in Table 2. Therefore, in comparing the test results for cells 4 and 5 it may be concluded that the $BMIMPF_6$ additive in the cell 5 electrolyte had a significant effect in activating the surface of the cell's magnesium anode.

TABLE 2

Electrolytes Tested for Mg/FeS$_2$ Air Cells

| Sample Cell[1] | Composition of Cathode | Electrolyte Composition | Atmosphere in Headspace | Average Discharge Voltage and Capacity to 1.0 V Cutoff[2] |
|---|---|---|---|---|
| 1—(Mg/Air) Comparative | 80 mg teflonized acetylene black | 0.5M Mg (ClO$_4$)$_2$ in acetonitrile solvent plus 1 wt % BMIMPF$_6$ additive[3] | Air | 1.5 Volt Capacity 16.7 mAhrs |
| 2—(Mg/FeS$_2$-Air) | 50 mg FeS$_2$ and 80 mg teflonized acetylene black | 0.5M Mg (ClO$_4$)$_2$ in acetonitrile solvent plus 1 wt % BMIMPF$_6$ additive | Air | 1.65 Volt Capacity 16.8 mAhrs |
| 3—(Mg/FeS$_2$-Air) | 100 mg FeS$_2$ and 80 mg teflonized acetylene black | 0.5M Mg (ClO$_4$)$_2$ in acetonitrile solvent plus 1 wt % BMIMPF$_6$ additive | Air | 1.74 Volt Capacity 15.1 mAhrs |
| 4—Mg/FeS$_2$-Argon) Comparative | 50 mg FeS$_2$ and 80 mg teflonized acetylene black | 0.5M Mg (ClO$_4$)$_2$ in acetonitrile solvent | Argon | 0.45 Volts Capacity less than 10 mAhrs |
| 5—(Mg/FeS$_2$-Argon) | 50 mg FeS$_2$ and 80 mg teflonized acetylene black | 0.5M Mg (ClO$_4$)$_2$ in acetonitrile solvent plus 1 wt % BMIMPF$_6$ additive | Argon | 1.3 Volts Capacity 15.0 mAhrs |

Notes:
[1]Anode for each cell was magnesium alloy sheet weight 0.117 grams (composition 96 wt % Mg, 3 wt % Al, 1 wt % Zn)
[2]Cell discharged at constant current drain of 0.1 mA to a voltage cutoff of 0.8 V.
[3]1-butyl-3-methylimidazolium hexafluorophosphate (BMIMPF$_6$)

The above indicated cell tests as summarized in Tables 1, 1A, and 2 show a distinct and surprising improvement in performance of the magnesium cells tested with the electrolytes of the invention, wherein at least one of the additives included in the electrolyte was selected from BMIMPF$_4$, BMIMPF$_6$, LiPF$_6$, or AlCl$_3$.

Although the invention has been described with reference to specific embodiments, it should be appreciated that other embodiments are possible without departing from the concept of the invention and are thus within the claims and equivalents thereof.

What is claimed is:

1. An electrochemical cell having a housing and an anode comprising magnesium or magnesium alloy and a cathode comprising iron disulfide (FeS$_2$), and an electrolyte within said housing, wherein said electrolyte comprises a magnesium salt dissolved in a solvent comprising acetonitrile and said electrolyte further comprises an additive lithium hexafluorophosphate (LiPF$_6$) in said solvent.

2. The cell of claim 1 wherein said magnesium salt comprises magnesium perchlorate (Mg(ClO$_4$)$_2$).

3. The cell of claim 1 wherein said additive comprises between about 0.5 and 4 percent by weight of said electrolyte.

* * * * *